US008719351B2

(12) United States Patent
Chen et al.

(10) Patent No.: US 8,719,351 B2
(45) Date of Patent: May 6, 2014

(54) IMAGE RESCALE BASED ON DEFINED CHARACTERISTICS

(75) Inventors: Danny Yen-Fu Chen, Austin, TX (US); Ta-Wei Lin, Taipei (TW); Chih-Wen Su, Taipei (TW); Meng Li Wong, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 12/559,984

(22) Filed: Sep. 15, 2009

(65) Prior Publication Data

US 2011/0066687 A1 Mar. 17, 2011

(51) Int. Cl.
G06F 15/16 (2006.01)

(52) U.S. Cl.
USPC ........................................................ 709/206

(58) Field of Classification Search
USPC ........................................................ 709/206
See application file for complete search history.

(56) References Cited

U.S. PATENT DOCUMENTS

| 5,826,034 | A  | * | 10/1998 | Albal ............................. 709/239 |
| 6,032,192 | A  | * | 2/2000 | Wegner et al. ................ 709/238 |
| 6,138,156 | A  | * | 10/2000 | Fletcher et al. ............... 709/224 |
| 6,310,601 | B1 |   | 10/2001 | Moore et al. |
| 6,457,044 | B1 | * | 9/2002 | IwaZaki ........................ 709/206 |
| 6,779,178 | B1 | * | 8/2004 | Lloyd et al. ................... 717/174 |
| 6,928,610 | B2 |   | 8/2005 | Brintzenhofe et al. |
| 7,216,290 | B2 |   | 5/2007 | Goldstein et al. |
| 7,360,166 | B1 |   | 4/2008 | Krzanowski |
| 7,499,975 | B1 | * | 3/2009 | Bombacino et al. .......... 709/206 |
| 2001/0054075 | A1 | * | 12/2001 | Miyanaga ..................... 709/206 |
| 2002/0004821 | A1 | * | 1/2002 | Togawa et al. ................ 709/206 |
| 2002/0016818 | A1 | * | 2/2002 | Kirani et al. .................. 709/203 |
| 2002/0133543 | A1 | * | 9/2002 | Fujiwara ....................... 709/203 |
| 2003/0028606 | A1 | * | 2/2003 | Koopmans et al. ........... 709/206 |
| 2003/0028647 | A1 | * | 2/2003 | Grosu ............................ 709/227 |

(Continued)

FOREIGN PATENT DOCUMENTS

| EP | 0 924 921 A1 * | 8/1997 | ............ H04M 11/08 |
| EP | 1265157 A2 | 11/2002 | |

OTHER PUBLICATIONS

Knutsson et al, "Architecture and Performance of Server-Directed Transcoding", ACM Transactions on Internet Technology, vol. 3, No. 4, Nov. 2003, pp. 392-424.*
Lotus Notes IBM Myattachments V3.82 (3 pages).

(Continued)

Primary Examiner — David Lazaro
Assistant Examiner — Robert Shaw
(74) Attorney, Agent, or Firm — Mark Vallone; Nicholas L. Cadmus

(57) ABSTRACT

A system and method automatically rescales an electronic message having one or more associated content. When the electronic message is generated and the associated content connected to the message, an agent of the electronic message application checks predefined settings/configurations of the message client. The sender's e-mail client checks a plurality of conditions, such as, the condition of the network, the type of network, the status or capacity of the receiving inbox of an intended recipient client, and the geographic destination of the message. Based on these dynamic content rescale settings, the sender's client dynamically and optimally rescales the associated content before forwarding the electronic message with the rescaled content to the recipient client. Rescaling of the associated content may be performed by the message exchange server or the recipient client. The recipient client may later request and receive a copy of the associated content without rescaling.

6 Claims, 7 Drawing Sheets

(56) References Cited

U.S. PATENT DOCUMENTS

| | | | |
|---|---|---|---|
| 2003/0084106 A1* | 5/2003 | Erev et al. | 709/206 |
| 2005/0044158 A1* | 2/2005 | Malik | 709/206 |
| 2005/0188026 A1* | 8/2005 | Hilbert et al. | 709/206 |
| 2005/0192966 A1* | 9/2005 | Hilbert et al. | 707/10 |
| 2005/0219640 A1* | 10/2005 | Kasatani | 358/402 |
| 2005/0254072 A1* | 11/2005 | Hirai et al. | 358/1.2 |
| 2006/0012833 A1* | 1/2006 | Ito et al. | 358/400 |
| 2006/0167940 A1* | 7/2006 | Colton et al. | 707/104.1 |
| 2006/0209867 A1* | 9/2006 | Schmidt et al. | 370/428 |
| 2006/0222256 A1* | 10/2006 | Sumiyoshi | 382/240 |
| 2006/0262349 A1* | 11/2006 | Moroi | 358/1.15 |
| 2006/0290997 A1* | 12/2006 | Okada et al. | 358/403 |
| 2007/0016613 A1* | 1/2007 | Foresti et al. | 707/104.1 |
| 2007/0100978 A1* | 5/2007 | Levi et al. | 709/223 |
| 2007/0136427 A1* | 6/2007 | Zellner et al. | 709/206 |
| 2007/0168561 A1* | 7/2007 | Hsu et al. | 709/247 |
| 2007/0174881 A1* | 7/2007 | Idehara et al. | 725/90 |
| 2007/0234239 A1* | 10/2007 | Sylthe et al. | 715/864 |
| 2007/0255792 A1* | 11/2007 | Gronberg | 709/206 |
| 2008/0184138 A1 | 7/2008 | Krzanowski | |
| 2008/0192302 A1* | 8/2008 | Rohall et al. | 358/402 |
| 2008/0216140 A1* | 9/2008 | Liwerant et al. | 725/113 |
| 2008/0307475 A1* | 12/2008 | Liwerant et al. | 725/109 |
| 2009/0049150 A1* | 2/2009 | Malik | 709/206 |
| 2009/0238475 A1* | 9/2009 | Getzinger et al. | 382/232 |

OTHER PUBLICATIONS

Knutsson et al., Architecture and Performance of Server-Directed Transcoding, ACM Transactions on Internet Technology, vol. 3, No. 4, Nov. 2003, pp. 392-424.

Li et al., Technology Supports for Distributed and Collaborative Learning Over the Internet, ACM Transactions on Internet Technology, vol. 8, No. 2, Article 10, Feb. 2008.

Borodin et al., Context Browsing with Mobiles—When Less is More, MobiSys '07, Jun. 11-14, 2007, Puerto Rico.

Automatically Resize Picture Attachments in Outlook 2007, http://www.howtogeek.com/howto/microsoft-office/automatically-resize-picture-attachments-in-outlook-2007/), Jul. 24, 2007.

Email Image Converter, http://www.emailimageconverter.com/settings/settings.aspx), Aug. 9, 2007.

* cited by examiner

| RS | SIZE | FROM | SUBJECT | RECEIVED |
|---|---|---|---|---|
|  | 2.2K | DIBBON, JAY | TEST RESULTS | 30 MAY 2008 |
|  | 1.7K | ANSWAR, PETER | TRIP ITINERARY | 28 MAY 2008 |
|  | 1.9M | BRACE, KIM | MEETING NOTES | 25 MAY 2008 |
|  | 7.6M | TOBO, STEVE | SAFETY CHECK | 3 APRIL 2008 |

605

| RS | SIZE | FROM | SUBJECT | RECEIVED |
|---|---|---|---|---|
|  | 2.2K | DIBBON, JAY | TEST RESULTS | 30 MAY 2008 |
|  | 1.7K | ANSWAR, PETER | TRIP ITINERARY | 28 MAY 2008 |
| ✓ | 0.7M | BRACE, KIM | MEETING NOTES | 25 MAY 2008 |
| ✓ | 1.3M | TOBO, STEVE | SAFETY CHECK | 3 APRIL 2008 |

IMAGE RESCALE BASED ON DEFINED CHARACTERISTICS

BACKGROUND

1. Technical Field

The present invention generally relates to data processing systems and in particular to an improved system and method for electronic information transfer via data processing systems.

2. Description of the Related Art

The utilization of electronic mail (e-mails) to communicate has become one of the more common forms of communication in today's computer age. In addition to simply sending text-based messages that are written or typed in the body of the e-mail, many users of e-mail clients/applications now utilize e-mail to attach and forward various types of attachments, including images. As an example, attaching a photo or image to an e-mail that is being sent to an intended recipient's e-mail address is a common usage of e-mail applications.

Conventionally, the attachments to an e-mail are typically of a much larger size than the text placed in the body of the e-mail. Further, with the use of high resolution digital cameras and advanced image editing tools, high quality photos and images can be easily produced. In many instances, images produced by such digital cameras and image editing tools are usually large in content size, which may cause issues (bandwidth, storage, and others) with managing e-mail delivery and receipt. In addition to photos, scanned images and other attached images having a large content size, may also cause similar issues with managing e-mail delivery and receipt.

When an e-mail is sent with an associated image having a large content size, the time required to complete the send and receive process from the local e-mail client to the intended recipient e-mail address generally takes much longer than with other e-mails that have an overall smaller content size (with or without an attachment). For example, when a local e-mail client is utilized to send an e-mail, the e-mail is forwarded to and received by an e-mail server, which then forwards the e-mail to a recipient e-mail client. If the network over which the e-mail is transmitted has a slow transmission rate (perhaps due to congestion and/or low bandwidth), the e-mail application being utilized may appear (to the sender) to be stuck, slow and/or unresponsive. An attachment to the e-mail that has a large content size could cause a bottleneck at any or all of the transit points (e.g., sender client, connecting routers, server, recipient client) and could cause a network delay, as well. In such scenarios, the e-mail application "freezes", preventing any further use of the application until the sending process of the e-mail is completed. The stuck/frozen e-mail application may ultimately cause frustration for the person utilizing the application, who wishes to utilize the application to complete other tasks.

If the sending e-mail application has a size limit associated therewith, a large photo or image attached to the e-mail may be precluded from being sent. The large size of the e-mail attachment may also cause problems for the intended recipient e-mail client/account, as well. Thus, a long time may be taken for the e-mail to reach the recipient client over the network, or the e-mail may be truncated in the inbox of the recipient client. Also, the large size of the e-mail may cause the recipient client to exceed an e-mail file size limit and/or receive a warning/notification indicating the same. Furthermore, once an intended recipient's e-mail inbox has reached a preset maximum capacity, the recipient's e-mail account may be locked by the e-mail application (or by a system administrator) such that the recipient e-mail account can no longer receive any e-mail until previously received e-mails are removed from the inbox.

SUMMARY

Disclosed are an intelligent and automated method, system and article of manufacture embodied as a computer program product for dynamically rescaling the size of content associated with an electronic mail (e-mail), based on predefined e-mail account settings and/or configurations. The e-mail application (e-mail client) and/or server is enhanced with a rescaling utility that enables selection and/or entry of characteristics, including preferences and conditions, to be used to rescale one or more content attached to an e-mail. Before rescaling the image(s) associated with an e-mail, the sending e-mail client may check a plurality of conditions, including, but not limited to, the original size of the image(s), the overall size of the e-mail envelope with the images and other content, the type and condition of the network, the e-mail size limit of the sending e-mail account, the size capacity of the recipient e-mail account inbox (if available), the geographical location and/or network distance (from the sending e-mail client) of the e-mail recipient client, and other pre-selected/pre-programmed considerations. With one or more of these conditions factored in, the rescaling utility automatically and optimally rescales the content associated with the e-mail. The e-mail client then forwards the e-mail to the network with the rescaled content associated therewith and/or embedded therein.

The above, as well as additional objectives, features, and advantages of the present invention will become apparent in the following detailed written description.

BRIEF DESCRIPTION OF THE SEVERAL VIEWS OF THE DRAWINGS

The invention itself, as well as advantages thereof, will best be understood by reference to the following detailed description of an illustrative embodiment when read in conjunction with the accompanying drawings, wherein:

FIG. 6 is a schematic illustrating two views of a recipient e-mail inbox of an recipient e-mail application/account before and after automatic resizing, according to one embodiment of the present invention.

DETAILED DESCRIPTION

Figure 1:
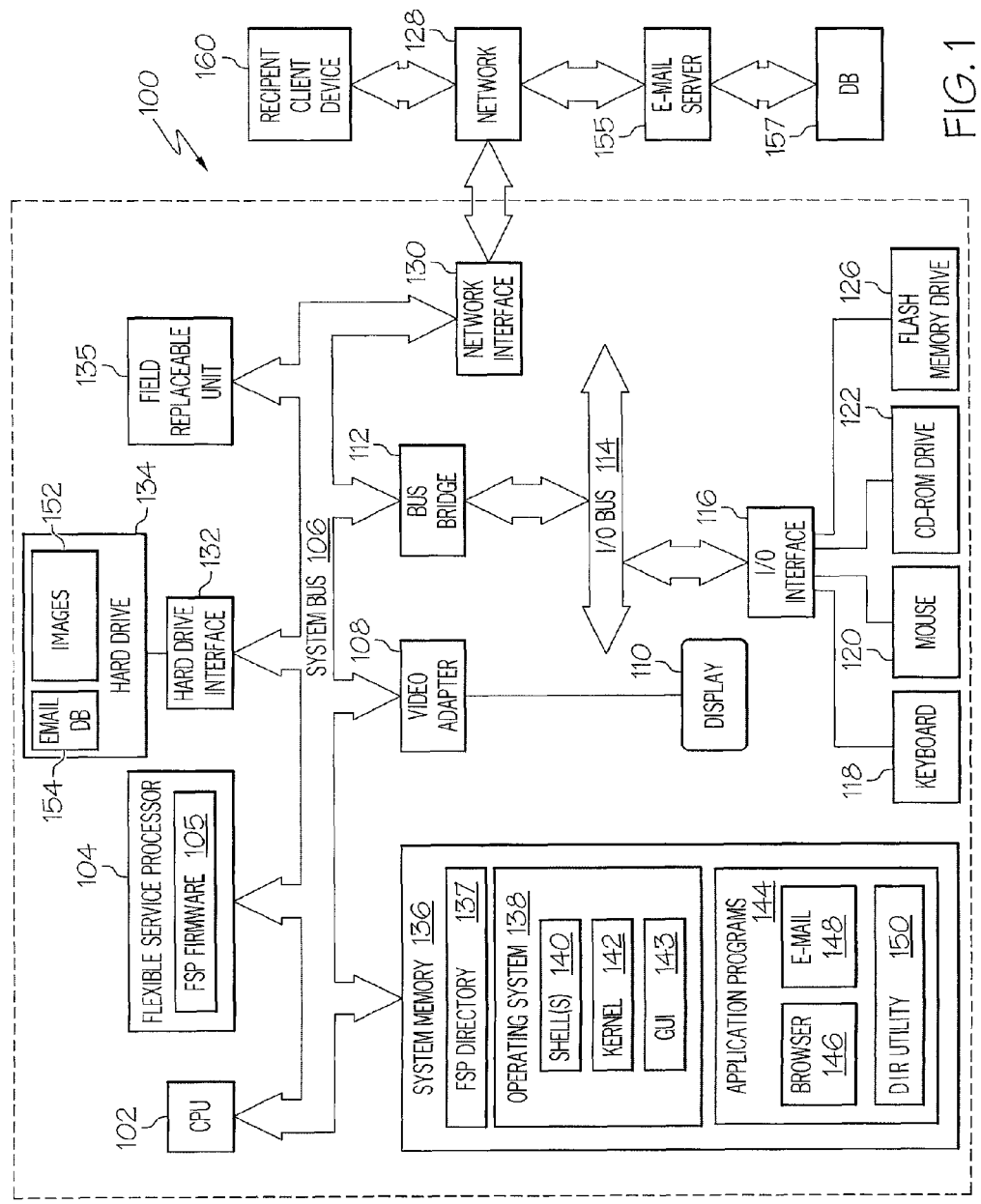
FIG. 1 is a high level block diagram of an example computer and computer network within which the invention may be implemented, according to an embodiment of the present invention.

Generally, the disclosed embodiments provide a system and method that automatically rescales an electronic message having one or more associated content. When the electronic message is generated and the associated content connected to the message, an agent of the electronic message application checks predefined settings/configurations of the message client. The sender's e-mail client checks a plurality of conditions, such as, the condition of the network, the type of network, the status or capacity of the receiving inbox of an intended recipient client, and the geographic destination of the message. Based on these dynamic content rescale settings, the sender's client dynamically and optimally rescales the associated content before forwarding the electronic message with the rescaled content to the recipient client. Rescaling of the associated content may be performed by the message exchange server or the recipient client. The recipient client may later request and receive a copy of the associated content without rescaling.

More specifically disclosed are an intelligent and automated method, system and article of manufacture embodied as a computer program product for dynamically rescaling the content size of images associated with an electronic mail (e-mail), based on predefined e-mail account settings and/or configurations. The e-mail application (e-mail client) and/or server is enhanced with a dynamic image rescaling (DIR) utility that enables selection and/or entry of characteristics, including preferences and conditions, to be used to rescale one or more image(s) attached to an e-mail. Before rescaling the image(s) associated with an e-mail, the sending e-mail client may check a plurality of conditions, including, but not limited to, the original size of the image(s), the overall size of the e-mail envelope with the images and other content, the type and condition of the network, the e-mail size limit of the sending e-mail account, the size capacity of the recipient e-mail account inbox (if available), the geographical location and/or network distance (from the sending e-mail client) of the e-mail recipient client, and other pre-selected/pre-programmed considerations. With these conditions factored in, the DIR utility automatically and optimally rescales the image(s) associated with the e-mail. The e-mail client then forwards the e-mail to the network with the rescaled image(s) attached thereto and/or embedded therein.

In one embodiment, the DIR utility enables completion of the rescaling operation at the local, sending e-mail client, before the e-mail is forwarded to the network by the sending e-mail client. According to other embodiments, the DIR utility may be located at the e-mail server and the server DIR utility completes the rescaling operation at the e-mail server. The amount of rescaling may be based on information about one or more of (1) the sending e-mail client (including the pre-established sending e-mail account parameters), (2) the network condition (bandwidth, congestion, etc.), which may be based on (3) geographical location, (4) time of day and other factors, and/or (5) the recipient e-mail client (or recipient e-mail account), as well as the other factors provided herein. In yet another embodiment, the DIR utility operates within the recipient e-mail client to complete the automatic rescaling either at the time of receipt of the e-mail (e.g., prior to placing the e-mail in the recipient account inbox) or at some time after the receipt of the e-mail and while the e-mail resides in the recipient's inbox.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Reference will now be made in detail to embodiments of the present invention, examples of which are illustrated in the accompanying drawings, wherein like reference numerals refer to like elements throughout. The specific numerals assigned to the elements are provided solely to aid in the description and not meant to imply any limitations (structural or functional or otherwise) on the described embodiment.

Also, it is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. For example, as utilized herein, the phrase "inclusion within" when referring to a separate file or image being included in an e-mail is assumed to be synonymous with and, where applicable, be inclusive of other phrases such as "associated with" or "attached to", "appended to", "embedded within", and the like. These phrases are assumed to individually refer to any method or mechanism by which a separate file, image, data, or application content (collectively referred to herein as e-mail appended content) is included with other standard e-mail content for transmission from a sender client to a recipient client.

Additionally, specific embodiments of the invention may be described from the perspective of an e-mail client with preset DIR preferences for sending and receiving e-mails via an e-mail exchange server. However, the term e-mail client is utilized in a general sense to also refer to the specific e-mail accounts rather than the application itself, and the setting of DIR preferences for outgoing and incoming e-mails occurs at individual account-level granularity (i.e., DIR preferences are set at the individual account level, such that a single e-mail client supporting multiple individual e-mail accounts will have individual sets of DIR preferences per individual e-mail account. One alternate embodiment does enable the application of DIR functionality with application-level granularity, whereby each client (application-level) has a single setting of DIR preferences applied to all user accounts accessed from that client, regardless of the different settings for each individual e-mail accounts.

Also, to preserve the breadth of the embodiments covering other electronic exchanges other than e-mails and other types of attachments other than images, certain portions of the specification are described from the perspective of electronic messages, associated content to electronic messages, sender client, recipient client, message exchange server, and other more generic terminology, as appropriate. From this more general perspective, the invention provides: a computer implemented method, a computer system, and a computer program product having the following functional features: responsive to an inclusion of one or more associated content within an electronic message, wherein the one or more content has a first content size which may be re-scaled: a dynamic content rescaling (DIR) agent executing on a processor accessing one or more dynamic content rescaling (DIR) settings; determining when one or more current conditions matches one or more pre-selected conditions under which a rescaling is to be performed; in response to said determining when one or more current conditions matches one or more pre-selected conditions under which a rescaling is to be performed, the processor dynamically initiating a re-scaling of the associated content to change a transmission size of the associated content and modify an overall size of the electronic message, based on the DIR settings; and forwarding the electronic message with the associated content to a recipient electronic client account; wherein, when the one or more current conditions and preset DIR settings trigger the dynamic re-scaling of the associated content, a rescaled version of the associated content is forwarded rather than an original-sized version.

Embodiments of the invention further provides: wherein said determining when one or more current conditions matches one or more pre-selected conditions under which a rescaling is to be performed, further comprises: accessing relevant settings associated with the one or more pre-selected conditions, which relevant settings indicates one or more of: (a) preset conditions under which rescaling of associated content is to be performed; (b) a level of rescaling supported for the associated content based on one or more pre-established factors; and (c) conditions under which no rescaling of associated content occurs; and (d) a null setting indicating no conditions and no DIR settings are present or pre-set; automatically accessing pre-established file re-scaling parameters of an electronic client from which the electronic message originates; and initiating the re-scaling based on the file re-scaling parameters and the relevant settings.

Still other embodiments provide that: the electronic message is an electronic mail (e-mail) and the e-mail is forwarded from one of a sender e-mail client or an e-mail server coupled via a network to a recipient e-mail client account; a copy of the DIR settings exists at both the sender e-mail client and the e-mail server; and the condition is evaluated at both the sender e-mail client and then at the e-mail server. Then, when the e-mail server detects one or more conditions meet a pre-established condition, performing server-level rescaling of a received e-mail with associated content. The e-mail server performs the following functions: retrieving information related to the DIR settings of the sender e-mail client from which the received e-mail was transmitted; and initiating a server-level rescale operation on the associated content based on the DIR settings of the sender e-mail client.

In yet another embodiment, the functions include: storing as a shadow file in a repository a copy of content of the original electronic message with an original-sized version of the associated content prior to a rescaling operation; and in response to a request from a recipient client of the electronic message, sending a copy of the shadow file to the recipient client without rescaling the associated content.

The dynamically rescaling the associated content comprises one or more of: performing the dynamically rescaling at a local sender client, wherein the associated content is rescaled prior to forwarding the electronic message when the local sender client is a sender of the electronic message; performing the dynamically rescaling at a local recipient client, wherein the associated content is rescaled substantially concurrent with or after receiving the electronic message, when the local recipient client is a receiver of the electronic message; performing the dynamically rescaling at a network-level server which routes the electronic message between the local sender client and the local recipient client, wherein the associated content is rescaled at least once at the network-level server. The dynamically rescaling is performed based on the DIR settings and the current conditions, which DIR settings are located at one or more of a local repository of the local sender client, a local repository of the local recipient client, and a server repository of the network-level server.

One embodiment provides for: automatically populating the server repository with DIR settings of at least one sender client or one recipient client by forwarding the DIR settings of the at least one sender client or one recipient client to the network-level server when the DIR settings are generated for the at least one sender client or one recipient client; and automatically updating the DIR settings at the server repository when an update is detected at the at least one sender client or one recipient client for which the DIR settings exists on the server repository.

Finally, in one embodiment, the following functions are supported: receiving DIR settings of an intended recipient client to which the electronic message is being forwarded; and performing the dynamically rescaling based on the DIR settings of the recipient client; wherein the DIR settings of the recipient client includes information about a capacity limit of the intended recipient client.

Referring now to FIG. 1, there is depicted a block diagram of an exemplary network-connected data processing system (or computer) 100, within which the dynamic image rescale system and method of the present invention may be utilized. Computer 100 includes central processing unit (CPU) 102, which is coupled to system bus 106. Computer 100 also includes flexible service processor (FSP) 104, which is coupled to system bus 106, and which includes FSP firmware 105. Computer 100 also includes field replaceable unit 135, which is coupled to system bus 106.

Video adapter 108, which drives/supports display 110, is also coupled to system bus 106. Input/Output (I/O) bus 114 is coupled via bus bridge 112 to System bus 106. I/O interface 116 is coupled to I/O bus 114. I/O interface 116 affords communication with various I/O devices, including, for example, keyboard 118, mouse 120, optical disk drive, such as Compact Disk-Read Only Memory (CD-ROM) drive 122, and flash memory drive 126. The format of the ports connected to I/O interface 116 may be any known to those skilled in the art of computer architecture, including, but not limited to, Universal Serial Bus (USB) ports.

In the illustrative embodiments, computer 100 may be any device hosting the sender e-mail client and from which an e-mail originates. Notably, computer 100 may, in alternate embodiments, also be a recipient e-mail client device (i.e., the device hosting the recipient e-mail client) or an e-mail exchange server that routes communication between a first e-mail client and Computer 100 connects to/communicates with server 155 via network 128 using network interface 130, which is coupled to system bus 106. As illustrated, computer 100 is able to communicate with server 155. Server 155 may be an e-mail exchange server having a corresponding e-mail database/repository 157. Network 128 may be an external network such as the Internet, or an internal network such as a Local Area Network (LAN), an Ethernet, or a Virtual Private Network (VPN). Coupled to server 155 is second client device 160, which serves as the device hosting the recipient e-mail client in the descriptions of various embodiments of the invention. In one embodiment, one or both of server 155 and second client device 160 may be configured similarly to computer 100.

In one embodiment, server 155 is a software deploying server, and computer 100 communicates with the software deploying server (155) via network 128 using network interface 130. Then, the DIR utility 150 may be deployed from/on the network, via software deploying servers (155). With this configuration, software deploying server (155) may also perform all of the functions associated with the execution of DIR utility 150. Accordingly, computer 100 is not required to utilize internal computing resources of computer 100 to execute DIR utility 150.

Hard drive interface 132 is also coupled to system bus 106. Hard drive interface 132 enables access to/communication with hard drive 134, which is a permanent storage facility that stores data, files, program code, and the like. In one embodiment, hard drive 134 populates system memory 136 with the various software applications/code/files/data that are required to enable processing by/on computer 100. Additionally, hard drive 134 may store one or more images 152 or other files/data that can be attached to, embedded within, or associated with an e-mail, depending on which part of the image rescaling process (sending, receiving or storage) the image is currently in. Also, hard drive 134 may also store local e-mail database 154 corresponding to an e-mail client/application executing on the computer 100.

System memory 136 is also coupled to system bus 106. System memory 136 is defined as a lowest level of volatile memory in computer 100. This volatile memory may include additional higher levels of volatile memory (not shown), including, but not limited to, cache memory, registers, and buffers. Data/code that populates system memory 136 includes FSP directory 137, Operating System (OS) 138, and application programs 144.

OS 138 includes shell(s) 140 to provide transparent user access to resources such as application programs 144. Generally, shell 140 (as it is called in UNIX®) is a program(s) that provides an interpreter function and an interface between a user and the OS 138. Shell 140 provides a system prompt, interprets commands entered by a user on keyboard 118, mouse 120, or other user input media, and sends the interpreted command(s) to the appropriate lower levels of the operating system (e.g., kernel 142) for processing. As depicted, OS 138 also includes Graphical User Interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management. During execution of the invention, OS 138 may provide a GUI, a dialog box, or a pop-up window using display 110 to enable selection on computer 100 of one or more e-mails which have an associated image which is to be rescaled, as described below in greater detail.

Application programs 144 may include a plug-in module, or web browser 146 and an e-mail application 148, which generates an e-mail client. For simplicity and consistency in usage throughout the application, future references to an e-mail application herein will be referred to as e-mail client 148. Additionally, as provided herein, application programs 144 may also include dynamic image rescaling (DIR) utility 150, which is associated with or exists as an executable subroutine/component embedded within e-mail client 148. DIR utility 150 may be a standalone module added to the existing computer to enhance e-mail client 148, or DIR utility 150 may exist as a subroutine or program segment of e-mail client 148. Browser 146 includes program modules and instructions enabling a World Wide Web (WWW) client (i.e., computer 100) to send and receive network messages to/from the Internet. Computer 100 may utilize HyperText Transfer Protocol (HTTP) messaging to enable communication with server 155. E-mail client 148 includes program modules, instructions, and one or more associated databases, such that e-mail client 148 is enabled to send/receive e-mail via the Internet, or the WWW in webmail embodiments, and to select (a) one or more e-mails which have one or more associated images or (b) one or more images associated with an e-mail to be rescaled, as described below in more detail.

In one implementation, DIR utility is provided as an e-mail DIR plug-in module, which executes on a local client device from which e-mail client executes to facilitate the DIR functionality provided by the various embodiments of the present invention. In one embodiment, in which the DIR plug-in module is not already installed on a browser for a web e-mail application, for example, the DIR plug-in module may be downloaded from e-mail server 155 or from e-mail database/repository 157 of e-mail server 155, to the remote computer. The DIR plug-in may provide a drop-down list or open a child window/GUI to allow selection of DIR preferences settings and also select whether to perform re-scale operations locally (on the remote computer) or on the e-mail server 155.

After installing and executing the plug-in on the remote computer, the rescale operation may be performed on the e-mail-associated content locally at the remote computer. The DIR preferences/condition settings of the user account are downloaded from the e-mail database/repository 157 of the e-mail server 155 to the remote computer. The e-mail is then rescaled on the remote computer based on the retrieved DIR preferences/condition settings, and the rescaled e-mail is sent to the e-mail server 155 for delivery to the intended recipient client.

Where the rescaling is desired to be perform at the e-mail server 155 (and not locally on the remote computer), selection of the option completing the rescaling at the e-mail server DIR 155 is detected, and the e-mail sending client enables composition of the e-mail, attaching of one or more e-mail associated content, and transmitting of the e-mail to the e-mail server 155. The e-mail is routed to the e-mail server 155 where the rescale operation on the e-mail is performed in accordance with the preset DIR preferences/condition settings that are stored in the e-mail database/repository 157 of the e-mail server 155. The rescaled e-mail will then be forwarded to the intended recipient client.

During processing, CPU 102 executes DIR utility 150, e-mail client 148, as well as OS 138, which supports the user interface features of DIR utility 150 and e-mail client 148. Certain functions supported and/or implemented by DIR utility 150 are provided via processing logic that is executed by the processor and/or device hardware to complete the implementation of that function. For simplicity of the description, the collective body of code that enables these various features is referred to herein as DIR utility 150. Among the software code/instructions/logic provided by DIR utility 150 (or DIR utility 150 in combination with e-mail client 148), and which are specific to the invention, are: (a) code/logic for detecting inclusion within an e-mail of one or more content having a first content size and which is transmitted to a recipient e-mail client from a sending e-mail client; (b) code/logic for automatically accessing (pre-established) content re-scaling parameters of the e-mail client in which the e-mail is detected; (b1) wherein the pre-established file re-scaling parameters indicate if, when, and how, and to what degree, the e-mail associated content is to be re-scaled for (1) transmission, (2) receipt and/or (3) storage at one or more of the sending e-mail client, the e-mail server, or the recipient e-mail client; (c) code/logic for dynamically performing the automatic rescaling of the e-mail associated content based on the pre-established re-scaling parameters and associated settings. According to the illustrative embodiment, when CPU 102 executes DIR utility 150 while processing e-mails with e-mail client 148, CPU 102 initiates a series of functional processes that enable the above functional features as well as additional features/functionality. These features/functionalities are described in greater detail below within the description of FIGS. 2-6.

Those of ordinary skill in the art will appreciate that the hardware components and basic configuration depicted in FIG. 1 may vary. The illustrative components within computer 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM® eServer™ pSeries® system, a product of International Business Machines Corporation in Armonk, N.Y., running the Advanced Interactive Executive (IBM AIX®) operating system or LINUX® operating system. IBM eServer pSeries and AIX are trademarks of International Business Machines Corporation in in the United States, other countries, or both. Linux is a registered trademark of Linus Torvalds in the United States, other countries, or both.

Embodiments of the invention define and enable selection of DIR preferences/conditions for an image rescale operation for an e-mail and associated content, such as image(s), prior to the e-mail and the associated content being sent to, and/or prior to the e-mail and associated content being received by a server or the recipient or after being received by a recipient. Specific embodiments described herein refer to re-scaling of an image, in addition to and/or in place of rescaling of the more generic e-mail associated content. It is appreciated that the functional features described herein that refer specifically to one or more images are also applicable to other content types as well, including for example, the entire e-mail envelope. In certain implementations, the features may be applied to an e-mail that does not include an image and/or an attachment. As provided for herein, the images associated as attachments to an e-mail may be in any conventional image format, such as bitmap (BMP) format, Joint Photographic Experts Group (JPEG) images, tagged image file format (TIFF) images, GIF images, etc. For example, in one embodiment, an image in BMP format could be rescaled and converted to a JPG image, which would have minimal loss of resolution from the original image and a smaller image content size than the BMP image. Similarly, in another embodiment, an image in JPG format could be rescaled and converted to a GIF image, which would have minimal loss of resolution from the original image and a smaller image content size than the JPG image. In a third embodiment, a GIF image could be rescaled and converted to a black and white grayscale image, which would have minimal loss of resolution from the original image and a smaller image content size than the GIF. Other embodiments enable similar changes in the content size without significant loss of resolution from the beginning image.

For the purpose of the present invention, "rescaling" an image includes changing the dimension (physical size), format, and/or color/gray scale of the image to optimally reduce the total content size of the image without significantly compromising the viewability and/or resolution of the image. In the present invention, an image is preferably always optimally rescaled, using known methods, to as small a content size as possible, with a minimal loss of resolution from the original image, so that a viewer of the rescaled image would not notice a significant loss of image quality relative to the original content. That is, the physical byte size of an image may be substantially reduced, but a user looking at the rescaled image will not notice a significant change in the view/perception of the image.

Figure 2:
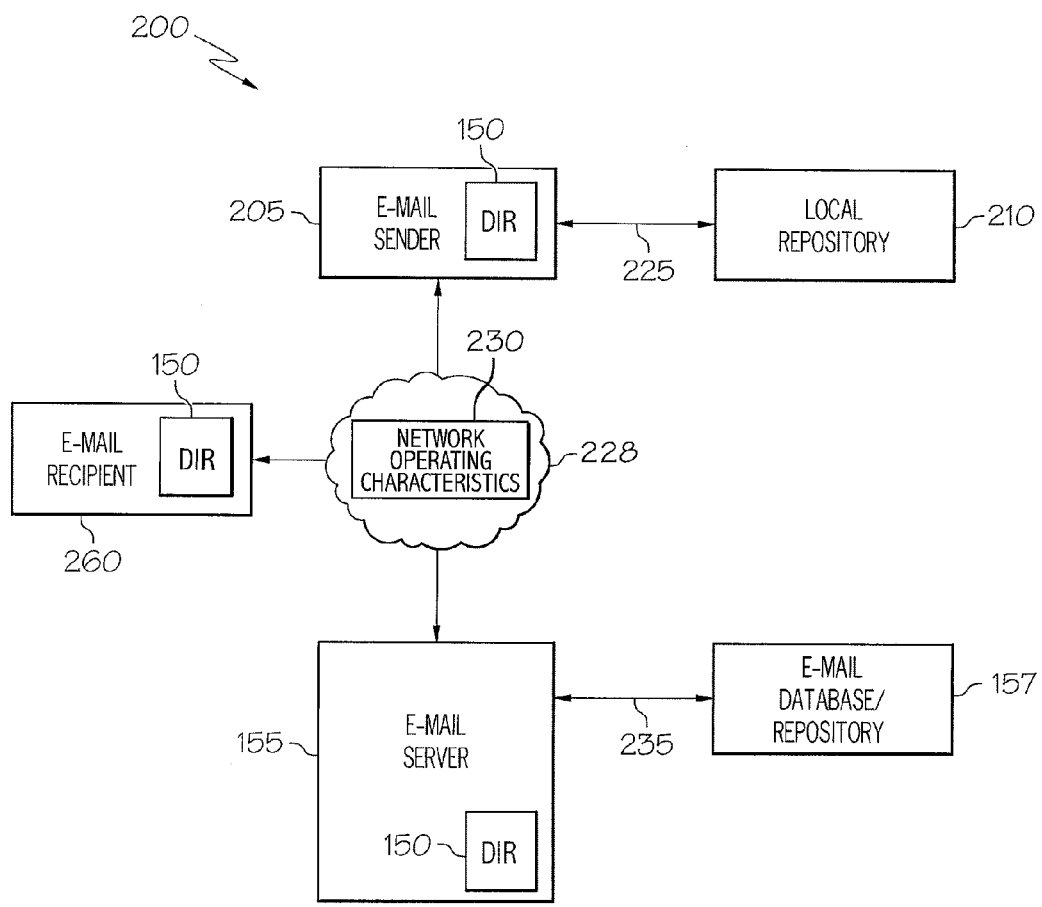
FIG. 2 is a block diagram depicting features of an automatic image rescale system, according to one embodiment of the present invention.

Referring now to FIG. 2, there are depicted functional blocks of a dynamic image rescaling (DIR) system 200 of the present invention. The DIR system 200 includes an e-mail sender client 205 (which may be executing as an application on computer 100 of FIG. 1), which has access to local repository 210. DIR system 200 also comprises an e-mail exchange server 155, which has a corresponding e-mail database/repository 157. Finally, DIR system 200 may include an e-mail recipient client 260, which may execute on a separate computing device or on the same computing device as e-mail sender client 205 or e-mail exchange server 155, depending on implementation. The e-mail recipient client 260 may also be the same e-mail client as the e-mail sender client 205. The e-mail sender/receiver client 205/260 may be a desktop computer or a laptop computer configured similar to computer 100 of FIG. 1, a portable wireless e-mail device (e.g., a Blackberry® device), or other electronic device usable to create, store and send and receive an e-mail. As described herein, e-mail sender/receiver client(s) 205/260 process e-mails that include one or more e-mail-associated content (e.g., attachments), which may include one or more digital photographs (photos) or other digital images associated with the e-mail.

According to one embodiment, e-mail sender/receiver client 205/260 is connected to e-mail exchange sever 155 through network 228 via one or more links which may be a wired or wireless link. E-mail sender/receiver client 205/260 may also be connected to local repository 210 via similar or different connection mechanisms. Local repository 210 stores the e-mail client's e-mail files, including image attachments, and stores a local e-mail client application and local e-mail agents of the present invention, described below in more detail, to be used with the local e-mail client application. The local repository 210 may be a readable/writeable memory device, such as a hard disk drive, incorporated within computer device of the e-mail sender/receiver client 205/260 or may be a separate data storage device, such as a central storage memory for a large corporation, an e-mail service provider, or an educational institution, which is connected to the e-mail sender/receiver client 205/260 via connection link 225. Connection link 225 may be the Internet or a private intranet, and may be a wired or a wireless connection.

An e-mail sent by the e-mail sender client 205 to e-mail receiver client 260 is sent to the e-mail server 155 and is stored in the e-mail database/repository 157. The e-mail server 155 may comprise a server e-mail application which includes e-mail agents of the present invention, described below in greater detail. The server e-mail application may also be e-mail application 148 of FIG. 1 in one embodiment. The e-mail database/repository 157 may be a readable/writeable memory device, such as a hard disk drive, incorporated within the e-mail server 155, but is more likely to be a database stored within a separate memory device, such as a main computer or a server farm of a large corporation, an e-mail service provider, or an educational institution. E-mail database/repository is connected to the e-mail server 155 via connection link 235, which may be the Internet or a private intranet, and may be a wired or a wireless connection.

As shown within the embodiment provided by FIG. 2, each component within DIR system 200 includes a local copy of DIR utility 150 to support the DIR functionality at each of the different nodes/points of the e-mail communication exchange. Certain embodiments may not provide DIR utility at the e-mail exchange server, as that server-level re-scaling is an optional implementation in which the e-mail sender/recipient may complete the re-scaling locally and does not require the server to further rescale the e-mail-associated content. Communication between e-mail sender/recipient client 205/260 and e-mail exchange server 155 occurs via one or more networks, with example network 228 illustrated. Within example network 228, various network-level transmission characteristics 230 are tracked, such as available bandwidth and transmission speed, which characteristics may be variable based on physical network configuration, usage parameters, time-of-day bandwidth usage or allocation, distance between communicating nodes on the network, and the like. As described in greater detail below, these network characteristics 230 affect the ultimate determination of the level/amount of re-scaling is required for a particular e-mail transmission or associated e-mail content.

As stated above, the DIR system 200 may be implemented on top of an existing e-mail application, such as the e-mail application 148 of FIG. 1, which generates an associated e-mail client. One or more graphic user interfaces (GUIs), for example GUI 143 of FIG. 1, may be displayed for e-mail sender/receiver client 205/260 for use with the e-mail functionality of the described embodiments. The one or more GUIs may be implemented according to any known convention, such as a pop-up box, a launched window, a status bar animation, etc. Additionally, in one embodiment, a DIR preference setting GUI is provided and utilized to establish or edit the predefined settings/configurations.

Figure 7:
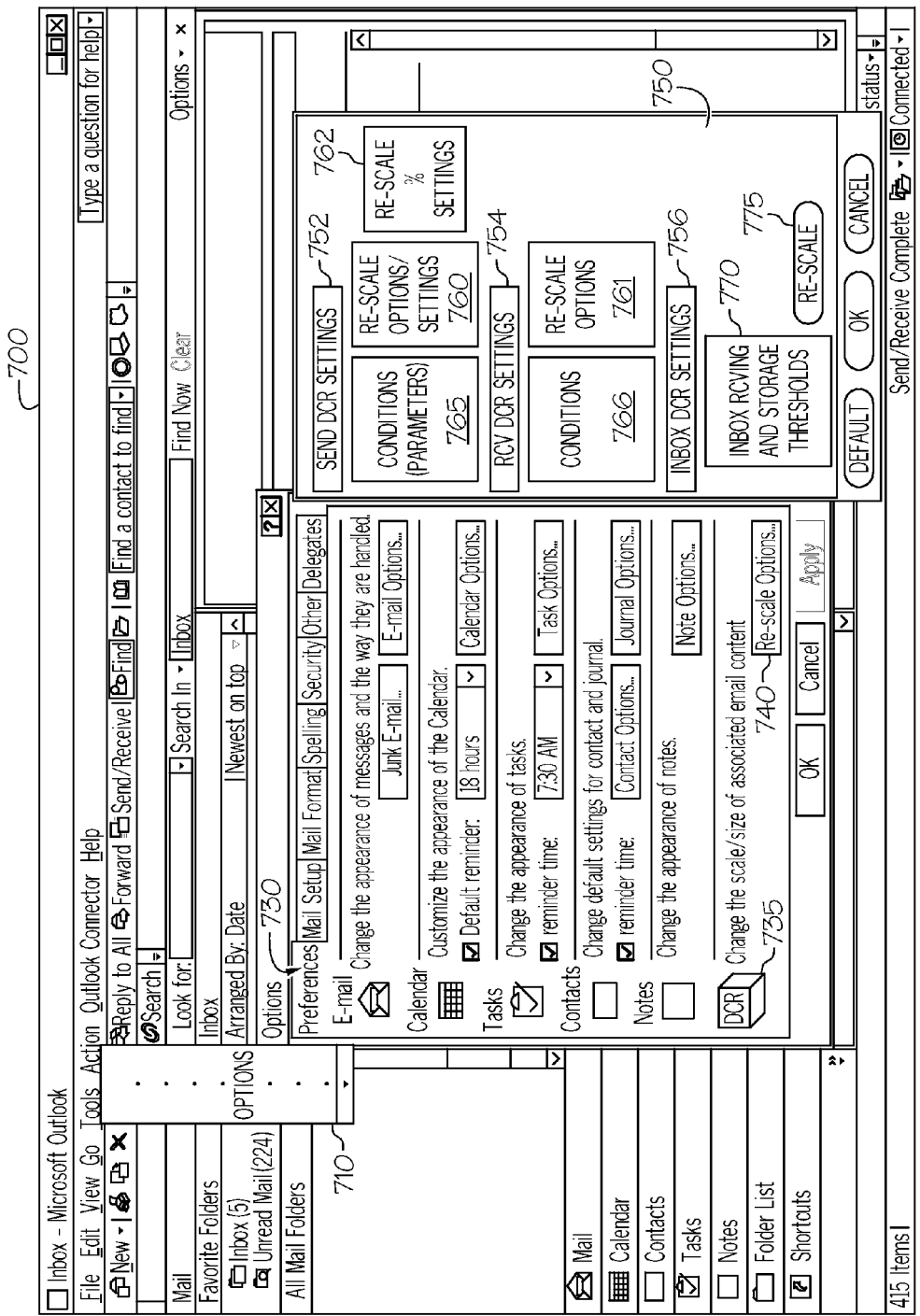
FIG. 7 illustrates an e-mail client GUI with which the preferences are pre-selected or pre-set for rescaling of e-mail-associated content, according to one embodiment.

FIG. 7 illustrates an example e-mail client GUI 700 with child windows generated to enable setting and pre-selection of DIR preferences to utilize for rescaling of e-mail-associated content, according to one embodiment. E-mail client GUI 700 includes top menu selections, such as File, Edit, and Tools. In the embodiment illustrated by FIG. 7, access to the DIR preference setting GUI 750 is provided via selection and opening of Options menu item within Tools drop down menu 710. Selection of options menu item opens multiple option setting tabs, including "preferences tab" 730. Preferences tab 730 is modified to include a DIR preference setting section 735, which provides a rescale options button 740. Once selection of rescale options button 740 is detected by e-mail client, DIR preference setting GUI 750 opens, providing several selectable options for setting conditions, e-mail re-scale options and characteristics and pre-selecting the preferences associated with the rescaling functionality described herein. As illustrated by FIG. 7, DIR preference setting GUI 750 is generated/opened within e-mail client GUI 700 following selection of rescale options button 740 in DIR preferences setting section 735. DIR preference setting GUI 750 may be implemented according to any known convention, such as known preference dialogs or wizards (i.e., a guided series of one or more preference dialogs). It should be understood that the specific illustration of one method of getting DIR preference setting GUI 750 from the top menu of the e-mail client GUI 700 is but one or multiple possible methods by which this feature may be implemented, and the invention applies regardless of the manner in which the re-scale options are set or pre-set for the e-mail client.

As illustrated within DIR preference setting GUI 750, one or more sets of preference settings may be pre-set, and three are provided for illustration. These preference settings relate to sending e-mail DIR settings 752, receiving e-mail DIR settings 754 and buffered e-mail DIR settings 756. The first set of preference settings is for sending e-mail, the second set is for receiving e-mail, and the third set for e-mail management of e-mails in the e-mail inbox opened within the e-mail client 700. No specific number of selectable affordances (i.e., buttons/icons linked to each preference setting to trigger entry/selection of the specific type of preference) is required. Also, other implementations may combine the e-mail send and receive and inbox setting preferences into a single entry mechanism such that the DIR preference setting GUI 750 provides only global settings to be utilized for the various e-mail send and receive functionality of the described embodiments.

According to one embodiment, within send DIR settings 752 are several selectable and/or "user entered" re-scale options/settings 760, including, for example, "optimize by current network throughput", "optimize for minimum viewable size," and the like. Additionally, a rescale percent entry 762 is provided for receipt of a % re-scaling desired (e.g., 50%, such that every e-mail associated content is reduced by 50% resolution as a default), unless overridden by other higher priority DIR considerations (such as current network bandwidth). Finally, a condition entry 765 is provided to establish parameters for the conditions (both local and network level conditions) that would trigger the dynamic rescaling, and in some embodiments, dictate the level of rescaling require. Some hierarchy of DIR characteristics may rank the characteristics and perform the optimization of the re-scaling based on a decreasing level of priority (i.e., default to highest priority item, then a next highest when highest priority DIR consideration is not available/applicable for the particular e-mail transmission). Selection of DIR characteristics to evaluate in determining the optimal re-scaling may be from a pull down menu of selectable DIR characteristics. The DIR utility may then utilize the selected DIR characteristics to collectively determine the level of re-scaling required (for optimal rescaling and transmission of e-mail envelope to the recipient).

Table 1 below depicts a non-exhaustive list of examples of various predefined/selected DIR characteristics, conditions, and other considerations which may be taken into account by the DIR system 200 of the present invention to determine an appropriate action to take in rescaling an image or other e-mail associated content.

TABLE 1

| Image Rescale Factors | Characteristics/conditions |
| --- | --- |
| Connection Type | User's Network Connection (Cable Modem, Dial-up, DSL, ISDN, T1, etc.)? |
| VPN Type | Sender/recipient using a VPN? |
| E-mail Size Limit | E-mail size limitation for e-mail server? For recipient's inbox? |
| Geographic location of recipient | Location based on recipient's e-mail address (U.S., China, Denmark, etc.)? |
| Response Time | Desired transmission response time? |
| Time of Day (TOD) | TOD (time zone for sender/recipient may be different)? |

TABLE 1-continued

| Image Rescale Factors | Characteristics/conditions |
| --- | --- |
| Network Traffic | Network conditions busy/slow when sending/receiving? |
| Additional conditions | SQL document? Min. image resolution width requirement? Etc. |

Referring again to FIG. 7, after one or more of the above DIR preferences are selected and/or defined for use with the DIR system, subsequent DIR operations are completed based on one or more of the image-rescale factors and characteristics depicted by way of example in Table 1. The selected DIR preferences and defined characteristics are stored in the local repository 210 and depending on implementation, e-mail database/repository 157 (FIG. 1). With the above example characteristics/preference parameters, regardless of the time of day, response time or network traffic condition, the goal of DIR utility is to optimize the rescale operation by using the selected DIR preferences and conditions. E-mail agents and scripts associated with the DIR utility enable the selected DIR preferences to automatically rescale (resize the content of) an e-mail and the e-mail associated content, based on the selected DIR preferences and defined characteristics, conditions and options setting.

According to one embodiment, a different set of DIR characteristics may be selected for receiving e-mail DIR settings 754, as well as for buffered e-mail DIR settings 756. For example, the characteristics of importance for a received e-mail may be simply to reduce storage space required to store the e-mail-associated content. Thus, where the sending e-mail client may consider the viewable quality of the content to be important and transmit the content at 90% rescaling, the receiving e-mail client may not consider quality to be as important as size and re-scale all received e-mail associated content by the maximum allowable reduction in size (e.g., to 50%). Since, the re-scaling is completed utilizing locally stored re-scaling software/code or specific network/server-accessible re-scaling software/code, the DIR utility on the e-mail client is able to restore the previously re-scaled content to within some degree of closeness to the original quality of the received content. Such restoration may be automatically triggered by detection of an input requesting content be opened for viewing at some time after the re-scaling has been completed at the e-mail client. Thus, as shown in FIG. 7, receive DIR settings also provide corresponding condition entry 766 and re-scale options/settings 761. Inbox settings include inbox receiving and storage thresholds 770 and a rescale button 775. When selection of rescale button 775 is detected, re-scale agent of e-mail client automatically initiates a re-scale of all e-mail associated content of e-mails within the Inbox or other folder (which may be granularly selected in one embodiment), based on the settings within inbox receiving and storage thresholds 770 and/or DIR preference setting GUI 750.

The preference settings may be stored in both the e-mail server 155 (FIG. 2) on the network and locally in the local repository 210. The local repository 210 and the e-mail database/repository 157 of e-mail server 155 may be synchronized with each other to replicate the defined characteristics/conditions/action settings for the DIR system 200 of the particular e-mail client. That is, the present invention supports replication from server to local client and from local client to server.

With this replication of DIR settings on the server (at which is stored an association of the DIR preference settings to a specific user account or to user accounts associated with the particular e-mail client), remote transmission of re-scaled content, based on user accounts, can be supported. This sever-implemented support for the DIR functionality described herein is particularly applicable for user accounts hosted on an on-line/Internet-based e-mail system, such as Yahoo® mail, Hotmail®, or Google® mail. Referring again to FIG. 2, the on-line e-mail account enables the application of the account DIR preferences even when the account is not opened at the local device (computer) from which the e-mail client is typically accessed. Thus, there is no need for the account to be directly linked to account's local repository 210 since the DIR preferences of the user account is stored both at local repository 210 (connected to a home/business desktop computer for example) as well as on the web e-mail server, via a web e-mail client.

In one embodiment, the original e-mail which contains the associated original one or more e-mail associated content is stored as a backup file, or "shadow file", in the local repository 210 of the sending e-mail client 205. Alternatively, the backup file may be stored at the e-mail database/repository 157 of the e-mail server 155 to save local memory space in the local repository 210. The recipient client may then process a later-in-time request for a copy of the shadow file, and download the original e-mail (prior to re-scaling) to the recipient's inbox of the recipient's e-mail client 260. In one embodiment, a synchronization function ("sync backwards") is triggered between the sending e-mail client and the e-mail server following receipt of a request from the recipient e-mail client for the original copy of the e-mail (before re-scaling), assuming that the original e-mail is not stored in the e-mail database/repository 157 for subsequent delivery to the e-mail inbox of the requesting recipient.

The original e-mail and original associated content (e.g., full resolution image(s)) may be sent to the recipient client automatically. In one embodiment, transfer of the original associated content (which is larger in size than the transmitted, e-mail associated content) may be provided on a scheduled download during off peak hours, for example, or at any time when the network is not congested. In one embodiment, DIR utility or e-mail client generates a link that is transmitted with the rescaled content in the e-mail. The link may then be utilized by the recipient client to access the original image, which is stored in either the e-mail server 155 or the e-mail database/repository 157. In one embodiment also, certain security functions may be implemented by DIR utility and enforced by clients and/or e-mail server 155 to ensure that only the sender client or recipient client of the particular e-mail can access the original content based on correct entry of the identification of the recipient client and/or sender client.

According to one alternate embodiment, which serves as an exception to a default setting of the e-mail client to "always optimally rescale" an image, based on the settings of the e-mail client(s), variations may be defined to the level of re-scaling and the time periods during which rescaling of an attached image occurs. In one implementation, the time of day may be a determining factor based on known usage characteristics of the network bandwidth. Thus, for example, during off-peak hours, or whenever the network is determined to not be slow or congested, the original content size image, or a slightly rescaled (slightly minimized content size) image may be sent with the e-mail without performing a complete rescaling of associated content. This second version of the e-mail may then replace the originally transmitted version with re-scaled image(s).

Figure 3:
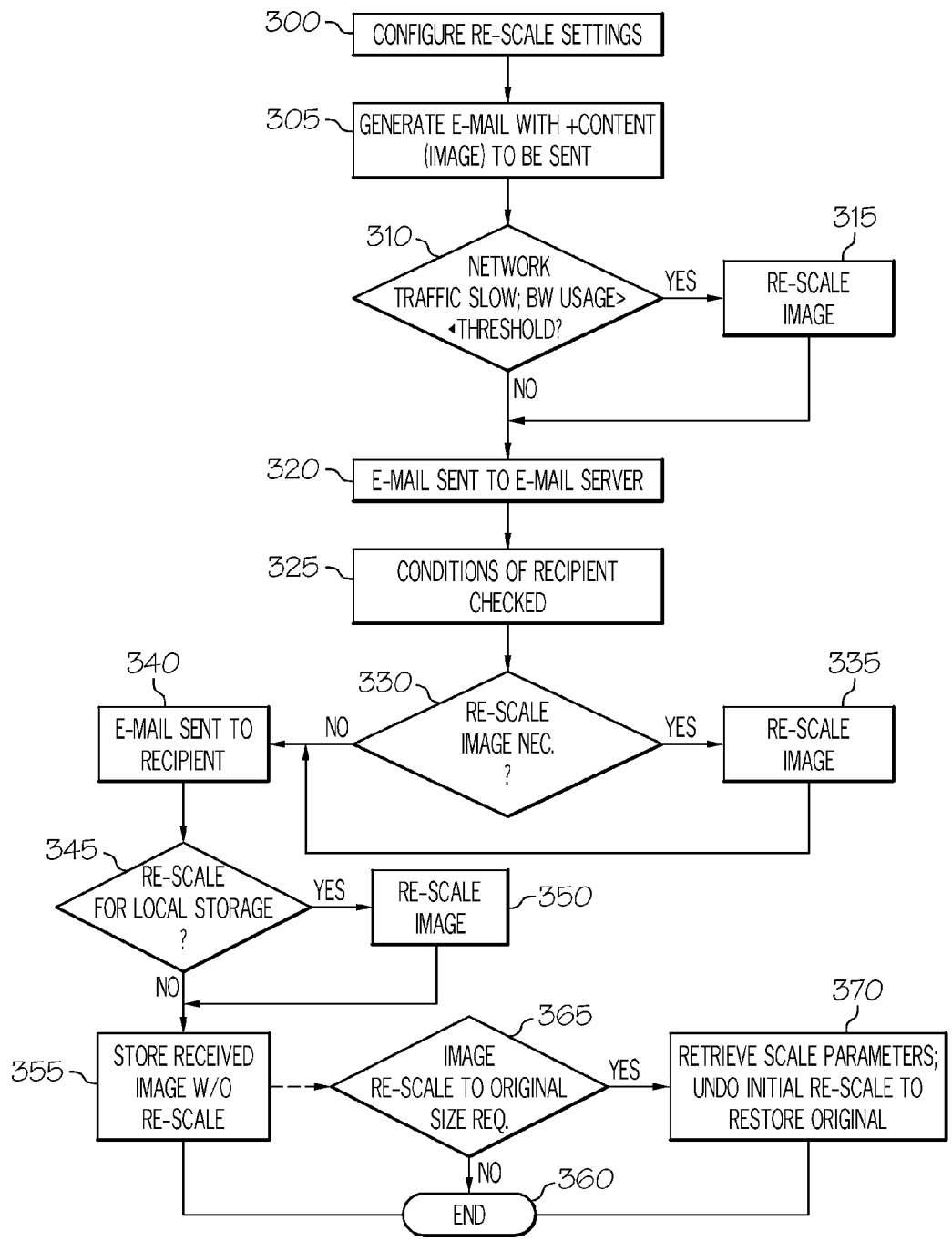
FIG. 3 is a logical flow diagram illustrating a method for dynamic/automatic rescaling of image(s) associated with an electronic communication, according to one embodiment of the present invention.

Referring now to FIG. 3, a logical flow diagram is depicted of one embodiment of a method for performing dynamic image rescaling on e-mail associated content (such as an image). Although the method illustrated in FIG. 3 may be described with reference to components shown in FIGS. 1-2 and 4-7, it should be understood that this is merely for convenience and alternative components and/or configurations thereof can be employed when implementing the various methods. Key portions of the methods may be completed by DIR utility 150 executing on CPU 102 within computer 100 (FIG. 1) and controlling specific operations on computer 100, and the methods are thus described from the perspective of both DIR utility 150 and computer 100 (or CPU 102).

In the flow diagram of FIG. 3, while the operations are described and illustrated in a particular sequence, use of a specific sequence of operations is not meant to imply any limitations on the invention. Changes may be made with regard to the sequence of the operations without departing from the spirit or scope of the present invention. Illustration of a particular sequence is therefore not to be taken in a limiting sense, and the scope of the present invention is defined only by the appended claims.

Before performing a rescale operation, the DIR utility first determines whether there is at least one image associated (attached) with the e-mail. If there is an image, the rescale operation proceeds as described below. If there is not an image associated, no rescale operation is carried out, since there is no image(s) to rescale. Beginning at operation 300, DIR utility enables selection of DIR preferences, conditions, criteria, and the like (e.g., defines preferences/conditions listed in Table 1) to be used to automatically rescale an e-mail having one or more associated content. At operation 305, an e-mail is generated on the sender client 205 (FIG. 2), which e-mail includes one or more e-mail associated content. On detection of a send command or at some point after/during generation of the e-mail envelope, a decision is made whether the network traffic is slow or whether the available network bandwidth falls below a pre-set threshold. The pre-set threshold is one of the conditions that are pre-established as a DIR preference/condition. In the illustrative embodiment, detecting the speed and available bandwidth of the network connection enables real-time modifications to the amount/level of re-scaling performed by the DIR utility on the e-mail associated content. In this example method, if network traffic is congested and response times are determined to be greater than a predetermined value or bandwidth is less than the preset threshold, the e-mail associated content is automatically rescaled, as shown at operation block 315. DIR utility performs this rescaling in order to reduce the size of the associated content, and thereby reduce the total e-mail content size. The reduced size of the e-mail enables the e-mail system (e-mail client, e-mail server and network) to more efficiently transmit the e-mail through the congested network.

In other embodiments, any or all of the other image rescale factors listed in Table 1 and introduced herein may be considered at decision block 310, such that the conditions/characteristics which correspond to the other rescale factors presented by/within Table 1 are evaluated. For example, known methods may be used to determine a geographic location of an intended recipient client by utilizing the recipient client's e-mail address. If a determination is made that the location is greater than a predetermined distance, DIR utility performs the rescaling of the e-mail associated content. In another example, if a VPN with limited bandwidth is being used for sending the e-mail, a rescale is automatically carried out by DIR utility.

Returning to the flow chart, if the e-mail agent determines that the network traffic is not congested or bandwidth limited, (e.g., by determining that network response times are less than a predetermined value), the e-mail is sent "as is" to e-mail server 155 at operation block 320. The rescaled e-mail is also sent to the server following the re-scaling at block 315. During operation 325, the e-mail server 155 checks the conditions of the e-mail recipient client (See, Table 1 above, for example). For example, e-mail server 155 may determine by utilizing data received from DIR utility of recipient client, whether the e-mail inbox of the recipient client's account has a size limit, whether the recipient client's e-mail inbox is nearly full, the geographic location of the recipient client, time of day approved for (optimal) transmittal, and other factors. If DIR utility on e-mail server determines that a recipient's inbox is within a predetermined percentage of full capacity (e.g., within 5% of capacity), DIR utility may generate a prompt issued to the e-mail recipient's account or client interface requesting a reduction be made to the e-mail size by rescaling the associated content. The rescaling of the e-mail may be completed automatically utilizing the characteristics/settings of Table 1, for example, or may be completed "off-line" prior to forwarding the e-mail to the intended recipient client inbox.

Depending on the conditions/factors/characteristics of the recipient determined during operation 325, a determination is made in operation 330 by an e-mail agent, whether an image rescale operation is necessary to comply with the preferences and defined settings of the recipient client inbox/account. If an image rescale is triggered (for example, optimal rescaling for image(s) must be carried out due to a change in network conditions or other characteristics, noted in Table 1 above, which change occurred after the e-mail was sent by the e-mail sender client 205), the DIR utility of e-mail server 155 automatic rescales the associated content at block 335. Following the re-scaling or if no server-level re-scaling was required, the e-mail server forwards the e-mail with the associated content at block 340. Thus, the e-mail received at the recipient client may be (a) not scaled; (b) scaled once, as received from the sender client or from the e-mail server; or (c) scaled twice at both the sender e-mail client and the e-mail server.

When an e-mail with associated e-mail content is received at the recipient e-mail client, DIR utility of recipient client checks its local DIR settings and determines at decision block 345 whether additional re-scaling is required to store the e-mail content. If additional scaling is required, DIR triggers the completion of the rescaling of the image, as shown at operation block 350. Then, e-mail client stores the associated content within local storage, as provided at operation block 355. The process then ends at block 360.

In one embodiment, which is illustrated within FIG. 3, the process proceeds to decision block 365 where a determination is made whether the original size of the image is requested (i.e., an undoing of the image re-scale). In this context, if no such image rescale is requested (typically at the recipient client), the process ends at block 360. However, where a request for the original sized content is detected/received, that request is transmitted to the server at which the rescaling parameters associated with the rescale operation that was performed on the associated content is retrieved, as shown at block 370. The original size of the rescaled content is restored via a reversed scaling process at the server (or the recipient client), as shown at block 375. In yet another embodiment, the original image is retrieved from the sender client repository and transmitted to the recipient client.

At the recipient client inbox, DIR utility enables an e-mail mailbox management function to reduce the content size of e-mail(s) in the e-mail inbox, again based on DIR settings associated with the e-mail client account. For example, in one embodiment, DIR utility triggers an automatic rescale operation of identified e-mails by first determining which e-mails, if any, in the e-mail inbox meet the conditions established by the DIR preferences and defined DIR settings. These DIR preferences and settings are stored in the local repository of the recipient client and/or in the e-mail database/repository 157, in some embodiments. For example, an e-mail which is stored in the recipient's e-mail inbox and which includes one or more images is automatically rescaled according to the recipient client's DIR preferences and defined settings. In one embodiment, an automatic rescale option may be selected within DIR preferences setting GUI 750 (FIG. 7), and detection of that selection would automatically rescale (resize the content of) all e-mails in the recipient's inbox (or other identified folders) or for a selected/highlight one or more e-mails.

In one more robust/dynamic application, the DIR preferences may be set to automatically rescale one or more e-mails (up to and including all e-mails) in the recipient inbox, based on a pre-specified "trigger", such as the size of the e-mails in the recipient inbox reaching a pre-set threshold maximum capacity (that may be less than full capacity) at which the automatic rescale operation is activated. In yet another embodiment, the dynamic rescale may be triggered for every e-mail having a content size greater than a pre-set trigger content size (e.g., 1 GB).

Table 2 below illustrates which devices within the DIR system 200 (FIG. 2) execute DIR actions, and particularly illustrates when the local e-mail agent and e-mail server agent are invoked.

TABLE 2

| Action/Function | Local e-mail agent invoked? | E-mail server agent invoked? |
|---|---|---|
| Sending e-mail | | |
| E-mail is sent from e-mail sender 205 | Yes | No |
| E-mail is sent from e-mail server 155 | No | Yes |
| Receiving e-mail | | |
| E-mail is at e-mail server 155 prior to being sent to recipient | No | Yes |
| E-mail is at recipient client | Yes | Yes |
| E-mail inbox management | | |
| User performs rescale function at e-mail sender/receiver 205 | Yes | No |
| User performs rescale function at e-mail server 155 | No | Yes |

Figure 4:
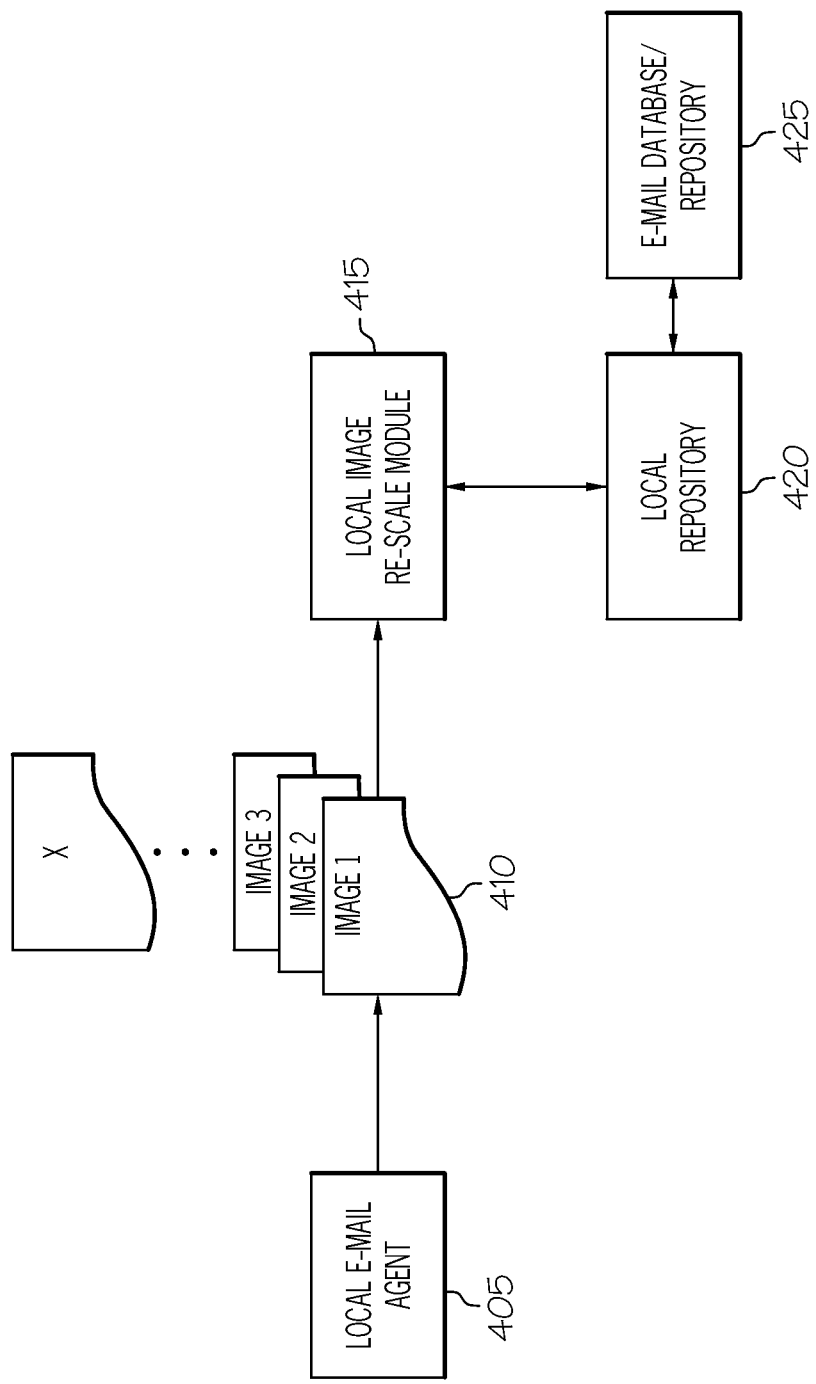
FIG. 4 is a block diagram illustrating a local e-mail client resizing images associated with an e-mail prior to storing or sending the e-mail, according to embodiments of the present invention.

Referring now to FIG. 4, a functional block diagram is depicted, illustrating functional components within a local e-mail client that enable image rescaling during creation of an e-mail, according to another embodiment. Key functional components include local e-mail agent 405 and local image rescale module 415. One or more images 410 are also illustrated as being forwarded from local e-mail agent 405 to local image rescale module 415. The one or more images 410 may be selected from local repository 420, which also stores the re-scaled version of the generated e-mail and/or image. The local e-mail agent 405 may forward the re-scaled version of the generated e-mail from the local repository 420 to e-mail database/repository. The local image rescale module 415 accesses the local repository for one or more DIR settings (e.g., those listed in Table 1), which are stored in the local repository 420 (as predefined DIR settings/configurations, which can be modified at any time). In some implementations, these DIR settings may be retrieved from e-mail database/repository 425. The local repository 420 may be connected to e-mail database/repository 425 to be synchronized with the local repository 420 so that the selected DIR preferences/conditions are the same at the local repository 420 and the e-mail database/repository 425.

The configuration of FIG. 4 further enables locally-stored e-mails (within the local repository 420) to be modified following detection of an activation/selection of a "scan and rescale" feature within the e-mail client. With this implementation, the local e-mail agent scans the folder (e.g., the inbox) containing the e-mails and identifies those e-mails having the searched-for criteria for re-scaling. As an example, the searched-for criteria may identify those e-mails having associated content, such as images or documents, which are of a size greater than a threshold size, which is preset within the predefined DIR settings/configurations. The associated content having an actual size greater than the threshold size will be rescaled (in the background) by the local image rescale module 415. In one embodiment, a prompt may be generated requesting confirmation of each re-scale operation before the rescale is performed on the particular associated content.

In one embodiment, according to the DIR system 200 of the present invention, all rescale operations are carried out by the e-mail server 155 based on account-level associated DIR characteristics/conditions/action settings for the DIR system 200. The DIR settings in this implementation are stored in the e-mail database/repository 157. In this embodiment, the associated content is/are not rescaled by the sending e-mail client prior to transmitting the e-mail to the e-mail server 155.

In a next embodiment, the recipient client of an e-mail which has one or more associated content performs a local rescale operation by rescaling received e-mail (which is in the recipient's e-mail inbox) based on the recipient client's user defined characteristics/conditions/action settings for the DIR system 200. In this implementation, the DIR settings are stored in the recipient's local repository 210 and/or in the e-mail database/repository 157 of the e-mail server 155.

Figure 5:
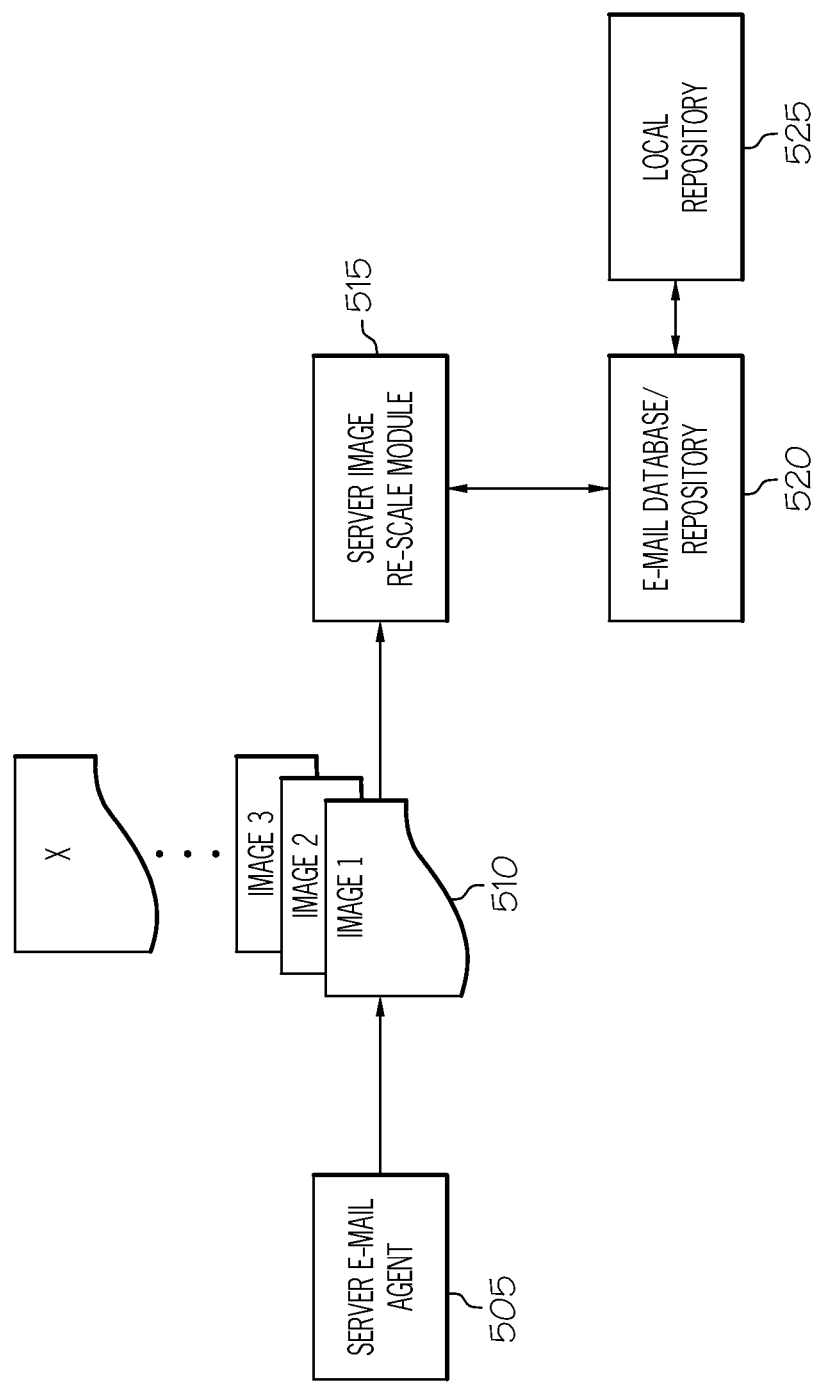
FIG. 5 is a block diagram illustrating an e-mail sever processing and resizing images associated with an e-mail, where image resizing/rescaling is accomplished at the mail server, according to one embodiment the present invention.

Referring now to FIG. 5, which illustrates a somewhat similar configuration of functional components as FIG. 4, but from the server level. With this sever-level configuration, server e-mail agent 505 and server image rescale module 515 execute similar functions as those of the local agent and local rescale module of FIG. 4. However, the rescaling operation occurs during routing of the e-mail with associated content. Also, the rescaling operation may occur at the server even though a prior rescaling operation may have been performed at the sending client. When the e-mail is received at the server, the server image rescale module 515 checks the predefined DIR settings/configurations of the sender client, which settings are stored in the e-mail database/repository 520. The server image rescale module 515 may rescale the associated content again based on current conditions detected by the server as well as the predefined DIR settings/configuration of the sending client. Changes may have occurred to network conditions between the first time the e-mail is generated at the sending client and the second time the e-mail is received at the server.

According to one embodiment, an additional check may be made by the server image rescale module 515 to determine whether a high priority e-mail should be rescaled at all. For example, the server image rescale module 515 may determine that, for an e-mail having a high priority, the time required to perform a rescale operation may be outweighed by the desire to have the high priority e-mail sent quickly to a recipient, regardless of other factors. In such a case, the server image rescale module 515 may determine to simply send the high priority e-mail "as is" and not perform the rescale operation.

In one embodiment, the DIR system 200 also supports dynamic update capability, which allows an image to be rescaled to reduce the size of an e-mail after the e-mail has been sent. In one implementation, a rescale command is reissued at the sending client, which command causes the e-mail server 155 to rescale the e-mail and the associated image(s) based on the predefined (or newly updated) DIR settings/configurations of the sending client.

As described above, in embodiments of the present invention certain characteristics and conditions are pre-selected, and/or values for the pre-selected conditions are pre-defined to trigger an automatic image rescale depending on whether those conditions are met and whether the automatic rescale feature has been activated within the specific client account. Additionally, the predefined and selected conditions and values may be configured for the automatic rescale feature depending on the type (i.e., format) of the image being attached to the e-mail. Furthermore, a maximum and minimum percentage of rescaling may be selected and applied. These values may be selected in order to avoid a loss of a minimum resolution of an image, for example.

In one embodiment, the DIR system 200 implements a check of the network traffic from the e-mail sender/receiver 205 to e-mail server 155. If the traffic is slow and/or congested, the e-mail and image will be automatically rescaled by the local image rescale module 415 to reduce the e-mail size content. The e-mail and rescaled image(s) will then be sent to the e-mail server 155 for another determination regarding whether further rescaling should occur prior to sending the e-mail onward to the intended recipient. If additional rescaling is required, the server image rescale module 515 performs a rescale of the attached image top reduce the e-mail size content before forwarding the e-mail to the intended recipient client.

FIG. 6 is a schematic depiction of "before" and "after" views of received e-mails within an example inbox of an e-mail client, according to one embodiment. First schematic represents original inbox view 605 (before rescaling), which shows specific characteristics of each of four e-mails, which characteristics are identified by the column headings. Reading from left to right, the first characteristic, which is identified with column heading "RS" or re-scaled, indicates whether the corresponding e-mail within the inbox has been locally (or remotely) rescaled. A check mark in the "RS" column, as depicted in view 610, indicates that the e-mail has been rescaled. Notably, in one embodiment, this check mark indicates a local rescale operation was performed on the e-mail, while in an alternate embodiment, the presence of a checkmark in the RS column may indicate that the e-mail has been rescaled at some point, alerting the client account that an original version of the associated content may be locally or remotely available. This alternate embodiment enables the recipient client to request transfer of the original content without rescaling, where a highest-available resolution copy of the content is desired. Additional characteristics provided by the schematics include: "Size", which provides the actual size of the entire e-mail envelope; "From", which indicates the sender client account at which the e-mail was generated or from which the e-mail was forwarded; "Subject", which presents the description of the e-mail entered at the sending client; and "Received", which provides the date the respective e-mail was received at the client's inbox.

Second schematic represents re-scaled inbox view 610 (i.e., after local rescaling operation is performed on the inbox or, with the alternate embodiment, where rescaling has occurred at some point between e-mail generation and the current presentation of the e-mail within the recipient client inbox). In re-scaled inbox view 610, the same e-mail entries are illustrated after two of the e-mails have been automatically rescaled. As shown, the e-mails received from "Brace" and "Tobo" have been rescaled, and the corresponding entries within the Size column have been adjusted to reflect the new reduced size of the corresponding e-mails. In this example, the e-mails received from "Brace" and "Tobo" each had at least one associated content that was reduced in size. The total delta in the size of each received e-mail can be seen by comparing the sizes indicated within the Size columns of inbox view 605 and re-scaled inbox view 610.

The automatic rescale system of the present invention automatically rescales an image based on considerations of various conditions, factors and scenarios. Flexible characteristic/condition/action settings can be managed in a centralized database which can be locally replicated for faster performance. In many of he above described embodiments, the rescale option may be different for each sender e-mail client and recipient e-mail client, depending on the pre-established DIR conditions and settings. In one embodiment, however, the DIR conditions and settings are preset for the e-mail application, and no modification is possible on a granular account or client level. All e-mails generated are thus given the same considerations with respect to performing DIR operations on associated content.

The embodiments enable a DIR utility to implement/execute processes for modifying (by reducing the size or by reducing the resolution, etc., of) an e-mail associated content, such as an attached image, document, and the like, before the e-mail with the associated content is sent to a recipient client. Other embodiments further enable the e-mail server to apply conventional rules for automatic resizing. Still other embodiments enable the e-mail agent of the recipient e-mail client to perform a scan of the recipient client inbox and trigger/initiate an automatic resizing of associated content for e-mails having such associated content. For each implementation, the re-sizing is performed such that the resulting re-sized content retains a minimum threshold quality level (e.g., a minimum resolution for an image). That is, the size of the e-mail envelope which includes the associated content is reduced, but the relative resolution/quality of the associated content is maintained above a pre-established standard.

One embodiment of the present invention also allows for configuration of e-mail receiving options at a recipient e-mail client to override the sender's e-mail client's auto resize detection settings. For example, the recipient e-mail client's receive/inbox settings may have priority in determining a rescale option for received e-mails. When the inbox settings are set to not allow resizing/rescaling of associated content received with an e-mail, for example, then the e-mail server reverses the resizing by the sender e-mail client so that the e-mail and the e-mail associated content are delivered to the recipient client without the associated image(s) being rescaled. Reversal of the resizing may be possible when the e-mail server has operational knowledge of which rescaling software is being utilized by the sender e-mail client and the level of re-scaling likely to be performed at the client. Alternatively, the e-mail server may send a request to the sender e-mail client requesting the original copy of the associated content for inclusion with the e-mail before forwarding to the recipient client. Likewise, when the recipient inbox settings are set to not permit receipt of associated content that is greater than a pre-established threshold maximum size, for example, then the e-mail server may further resize the associated content to meet the limits established on the recipient inbox, so that the e-mail and the e-mail associated content are delivered to the recipient client with the associated image(s) being smaller than the pre-established threshold maximum size for the recipient client's inbox.

Implementation of the embodiments of the invention are based on a recognition that conventional image editors rescale the content associated with an e-mail without consideration for content size and other particulars supported by the sender and/or recipient e-mail client. Thus, the embodiments described herein address and/or substantially eliminate the various issues with the conventional methods. Implementation of the embodiments of the present invention within e-mail applications and e-mail server software will result in significant efficiency and speed improvement of sending and receiving e-mails having large associated images. The utilization will further result in significant space saving at the recipient device and will resolve e-mail capacity limitation issues for a sending client and intended recipient client of the e-mail.

While the present invention has been particularly shown and described with reference to specific embodiments, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the embodiments of the present invention can also be embodied as programs defining functions as computer-readable codes on a computer-readable medium. The computer-storage medium may be a computer-readable medium, which can include a computer-readable recording medium and/or a computer-readable/writeable recording medium. The computer-readable recording medium is any data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices.

The computer-readable recording medium can also be distributed over network coupled computer systems so that the computer-readable code is stored and executed in a distributed fashion. Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalent.

What is claimed is:

1. A method for sending an electronic message, the method comprising the steps of:
    a server receiving a first electronic message from a message sending client, wherein the first electronic message includes a first content, and wherein the first content is original content of the electronic message rescaled based on a first set of settings of the message sending client;
    the server receiving a second set of settings from a message receiving client;
    the server determining that the second set of settings is to be used to rescale the first content;
    the server sending a second electronic message to the message receiving client, wherein the second electronic message includes a second content, and wherein the second content is the first content rescaled based on the second set of settings;
    the server receiving the original content of the electronic message from the message sending client;
    the server storing the original content of the electronic message; and
    the server automatically sending, based on network characteristics, the original content to the message receiving client after the sending of the second electronic message to the message receiving client.

2. A computer system for sending an electronic message, the computer system comprising:
    one or more computer processors;
    one or more computer-readable recording media;
    computer-readable code stored on the computer-readable recording media for execution by at least one of the one or more processors, the computer-readable code comprising:
        computer-readable code to receive a first electronic message from a message sending client, wherein the first electronic message includes a first content, and wherein the first content is original content of the electronic message rescaled based on a first set of settings of the message sending client;
        computer-readable code to receive a second set of settings from a message receiving client;
        computer-readable code to determine that the second set of settings is to be used to rescale the first content;
        computer-readable code to send a second electronic message to the message receiving client, wherein the second electronic message includes a second content, and wherein the second content is the first content rescaled based on the second set of settings;
        computer-readable code to receive the original content of the electronic message from the message sending client;
        computer-readable code to store the original content of the electronic message; and
        computer-readable code to automatically send, based on network characteristics, the original content to the message receiving client after sending the second electronic message to the message receiving client.

3. A computer program product for sending an electronic message, the computer program product comprising:
    one or more computer-readable recording media and computer-readable code stored on the one or more computer-readable recording media, the computer-readable code comprising:

computer-readable code to receive a first electronic message from a message sending client, wherein the first electronic message includes a first content, and wherein the first content is original content of the electronic message rescaled based on a first set of settings of the message sending client;

computer-readable code to receive a second set of settings from a message receiving client;

computer-readable code to determine that the second set of settings is to be used to rescale the first content;

computer-readable code to send a second electronic message to the message receiving client, wherein the second electronic message includes a second content, and wherein the second content is the first content rescaled based on the second set of settings;

computer-readable code to receive the original content of the electronic message from the message sending client;

computer-readable code to store the original content of the electronic message; and computer-readable code to automatically send, based on network characteristics, the original content to the message receiving client after sending the second electronic message to the message receiving client.

4. The method of claim 1, wherein the automatically sending is performed absent the server receiving a request from the message receiving client for the original content.

5. The computer system of claim 2, wherein the computer-readable code to automatically send comprises computer-readable code to automatically send the original content to the message receiving client absent a request from the message receiving client for the original content.

6. The computer program product of claim 3, wherein the computer-readable code to automatically send comprises computer-readable code to automatically send the original content to the message receiving client absent a request from the message receiving client for the original content.

* * * * *